United States Patent
Votel

(10) Patent No.: US 10,421,688 B2
(45) Date of Patent: Sep. 24, 2019

(54) LATEX-BASED FORMULATIONS FOR COATING AND SCULPTING APPLICATIONS

(71) Applicant: Flex-a-Rock Holdings, LLC, Dallas, TX (US)

(72) Inventor: John Votel, Jacksonville, FL (US)

(73) Assignee: Flex-a-Rock Holdings, LLC, Dallas, TX (US)

( * ) Notice: Subject to any disclaimer, the term of this patent is extended or adjusted under 35 U.S.C. 154(b) by 168 days.

(21) Appl. No.: 15/007,618

(22) Filed: Jan. 27, 2016

(65) Prior Publication Data

US 2016/0221873 A1 Aug. 4, 2016

Related U.S. Application Data

(60) Provisional application No. 62/109,309, filed on Jan. 29, 2015, provisional application No. 62/111,266, filed on Feb. 3, 2015.

(51) Int. Cl.
| | | |
|---|---|---|
| *B05D 5/00* | (2006.01) | |
| *C04B 24/26* | (2006.01) | |
| *C04B 28/04* | (2006.01) | |
| *C04B 26/04* | (2006.01) | |
| *C09D 5/02* | (2006.01) | |
| *C04B 111/00* | (2006.01) | |

(52) U.S. Cl.
CPC ............... *C04B 24/26* (2013.01); *B05D 5/00* (2013.01); *C04B 26/04* (2013.01); *C04B 28/04* (2013.01); *C09D 5/024* (2013.01); *C04B 2111/00482* (2013.01); *C04B 2111/00525* (2013.01); *C04B 2111/00663* (2013.01); *C04B 2111/00956* (2013.01); *Y02W 30/97* (2015.05)

(58) Field of Classification Search
CPC .......... B05D 5/00; C04B 24/00; C04B 26/00; C04B 28/00
USPC ..................................................... 427/385.5
See application file for complete search history.

(56) References Cited

U.S. PATENT DOCUMENTS

| | | | |
|---|---|---|---|
| 3,196,122 A | 7/1965 | Evans et al. | |
| 3,697,263 A * | 10/1972 | Mammino | G03G 21/0088 430/117.3 |
| 4,111,868 A | 9/1978 | Ficken | |
| 4,339,362 A | 7/1982 | Pascau | |
| 2005/0214507 A1* | 9/2005 | McDonald | B28B 11/245 428/138 |
| 2009/0085253 A1* | 4/2009 | Kruss | C04B 28/04 264/333 |
| 2010/0113651 A1* | 5/2010 | Hamada | C04B 24/2647 524/8 |
| 2013/0284069 A1* | 10/2013 | Dubey | C04B 7/32 106/695 |
| 2014/0107295 A1* | 4/2014 | Hatae | H01L 23/293 525/107 |

OTHER PUBLICATIONS

Quikrete (Mixing Concrete—Hand Mixing. Datasheet [online]. Quikrete, Oct. 11, 2011 at 21:02:23 [retrieved on Dec. 11, 2017]. Retrieved form the internet:<URL: https://web.archive.org/web/20111011210223/https://www.quikrete.com/athome/video-mixing-concrete-hand.asp>.*
Spangler, "Wet Curing and Drying Time," Wagner Meters, dated Nov. 14, 2014, retrieved by PCT Examiner on Apr. 28, 2016, 3 pages. http://www.wagnermeters.com/flooring/rapid-rh-concrete-moisture/wet-curing-drying-time/.
PCT International Search Report, dated Jun. 2, 2016, for PCT Patent Application Serial No. PCT/US16/15414, 2 pages.
PCT Written Opinion, dated Jun. 2, 2016, for PCT Patent Application Serial No. PCT/US/16/15414, 5 pages.

* cited by examiner

*Primary Examiner* — Charles Capozzi
*Assistant Examiner* — Hai Y Zhang
(74) *Attorney, Agent, or Firm* — Kirby Drake

(57) ABSTRACT

Latex-based formulations for coating and sculpting applications may provide blending a wet mixture with a dry mixture or blending a wet composition with a dry powder. The formulation may then be applied to a surface. In some embodiments, after the formulation is applied to a surface, the formulation may be set to the surface by covering the formulation applied to the surface with a material and/or the formulation may be self-setting on the surface. The formulation may fill gaps in the surface, thereby reducing cracks and shrinkage of the surface. The formulation may be applied to surfaces in a plurality of applications that may include, but are not limited to, sculpting, molding, and cosmetic repairs.

5 Claims, No Drawings

LATEX-BASED FORMULATIONS FOR COATING AND SCULPTING APPLICATIONS

CROSS REFERENCE TO RELATED APPLICATIONS

This application claims the benefit under 35 U.S.C. § 119(e) of U.S. Provisional Patent Application Ser. No. 62/109,309 filed on Jan. 29, 2015, entitled "LATEX BASED FORMULATIONS FOR COATING AND SCULPTING APPLICATIONS," and of U.S. Provisional Patent Application Ser. No. 62/111,266 filed on Feb. 3, 2015, entitled "LATEX BASED FORMULATIONS FOR COATING AND SCULPTING APPLICATIONS," which are incorporated by reference in their entirety.

FIELD OF THE DISCLOSURE

The present disclosure generally relates to formulations for coating and sculpting applications. More specifically, the present disclosure provides latex-based formulations suitable to provide coatings, sculptable forms, castings, and fillers.

BACKGROUND

In many coating applications, it is desirable for coatings to exhibit high levels of adhesion to surfaces that do not include adhesive properties, such as metal surfaces. A combination of high adhesive properties and low density enables coatings with substantial thicknesses to adhere to different surfaces, including inclined surfaces and vertical surfaces. However, when the thickness of a coating exceeds approximately 0.25 inches, the coating often will not adhere to surfaces. For example, as latex coatings must completely dry on surfaces, multiple layers of latex coatings can be required to successfully adhere to and be cured on surfaces. Additionally, some coatings cause surfaces to crack. To solve the problem of surface cracking, in the past, polymer microparticles have been added to cement coatings to improve the resilience and resistance of surfaces. However, cement coatings including polymer microparticles can be relatively brittle and can still create cracks under mechanical stress.

SUMMARY

Embodiments of the present disclosure may provide a method of forming and applying a latex-based formulation to a surface. The latex-based formulation may include a wet mixture and a dry mixture to form the formulation. The method may provide the step of blending the wet mixture and the dry mixture. The wet mixture may include a plurality of latex polymer microparticles, and the dry mixture may include at least one absorbent material. The method may further provide the step of applying at least one layer of the latex-based formulation to the surface. The method may provide the step of curing the surface where the latex-based formulation has been applied, thereby reducing cracking and shrinkage of the surface. Blending may be performed by at least one of hand kneading and mechanically mixing the wet mixture and the dry mixture. The surface may be coated with water prior to or after blending the wet mixture and the dry mixture. Further, the at least one absorbent material may include an inorganic material that may be selected from the group that may include cellulose, Kaolin clay, vermiculite, corn cob, talc, volcanic ash, peat, and sawdust. The at least one absorbent material may be an expanded volcanic mineral treated with a surfactant. The latex-based formulation may fill gaps in the surface.

Embodiments of the present disclosure may provide a method of forming and applying a latex-based formulation to a surface. The latex-based formulation may include a wet mixture and a dry mixture. The method may provide the step of blending the wet mixture and the dry mixture to form the formulation. The wet mixture may include at least one of a latex emulsion and a plasticizer. The dry mixture may include at least one of an absorbent powder, a superabsorbent powder, and a plurality of fine aggregates. The method may provide the step of applying at least one layer of the latex-based formulation to the surface, thereby filling gaps in the surface. The method may provide setting the latex-based formulation on the surface, and the surface may be covered with a material for a first period of time. The method may provide the step of adding the dry mixture to the wet mixture during the blending step. The blending step may provide at least one of hand kneading and mechanically mixing the dry mixture and the wet mixture to form the latex-based formulation. The method may provide the step of blending that may include mixing a net formulation including approximately 3-5% latex emulsion and elastomer solids, approximately 0-2% cement, and approximately 10-30% cellulosic fiber, and may provide that the resultant latex-based formulation is castable. The method may provide the step of drying the surface for a second period of time that may be after the latex-based formulation is applied and set on the surface. The method may further provide the step of curing the surface, thereby reducing cracking and shrinkage of the surface. Further, the dry mixture may include an inorganic material that may be selected from the group that may include cellulose, Kaolin clay, vermiculite, corn cob, talc, volcanic ash, peat, sand, water, silica, ether, talc, acrylic, defoamer, titanium oxide, aluminum oxide, calcium carbonate, talc, plasticizer, biocide, cellulose, and sawdust.

Embodiments of the present disclosure may provide a method of forming and applying a latex-based formulation that may comprise a wet mixture and a dry mixture. The method may provide blending the wet mixture and the dry mixture to form the formulation, wherein the wet mixture may include at least one of a latex emulsion and a plasticizer, and the dry mixture may include at least one of an absorbent powder, a superabsorbent powder, and a plurality of fine aggregates. At least one layer of the formulation may then be applied to the surface, wherein the formulation may fill gaps in the surface. The formulation may set on the surface, wherein the surface is self-setting after a period of time. The surface may then be dried, and the surface may be cured where the formulation has been applied and dried, thereby reducing cracking and shrinkage of the surface. The blending step may comprise adding the dry mixture to the wet mixture, and then at least one of hand kneading and mechanically mixing the dry mixture and the wet mixture to form the formulation. At least one of the absorbent powder, the superabsorbent powder, and the plurality of fine aggregates may include an inorganic material selected from the group comprising cellulose, Kaolin clay, vermiculite, corn cob, talc, volcanic ash, sawdust, citric acid, and confectioners sugar.

Embodiments of the present disclosure may provide a method of forming and applying a latex-based formulation to a surface. The latex-based formulation may include a wet composition and a dry powder. The method may provide blending the wet composition and the dry powder to form the formulation, and the wet composition may include at least one of a latex emulsion and a plasticizer, and the dry powder may include at least one of an absorbent powder, a superabsorbent powder, and a plurality of fine aggregates. The method may further provide applying at least one layer of the formulation to the surface. The method may provide curing the surface where the formulation has been applied, thereby reducing cracking and shrinkage of the surface. The blending step may include at least one of hand kneading and mechanically mixing the wet composition and the dry powder. The method may provide the step of blending that may include mixing a net formulation including approximately 30% latex emulsion and elastomer solids, approximately 14% plasticizer, approximately 3% cement, and approximately 18% cellulosic fiber, wherein the resultant latex-based formulation may be castable. The method may provide coating the surface with water prior to the blending step. Additionally, the method may provide coating the surface with water after the blending step. Further, the dry powder may include an inorganic material may be selected from the group that may include cement, Kaolin clay, vermiculite, corn cob, talc, volcanic ash, peat, confectioners sugar, citric acid, sand, cellulose, coconut husk, and sawdust.

Other technical features may be readily apparent to one skilled in the art from the following descriptions and claims.

DETAILED DESCRIPTION

The present disclosure may provide latex-based formulations and, more particularly, latex-based formulations that may be useful as coatings, fillers, castings and patch materials for different applications, including but not limited to, cosmetic, artistic and even some structural applications. Latex-based formulations may be formed by different methods, including, but not limited to, blending a wet mixture and a dry mixture, and blending a wet composition and a dry powder. A wet mixture/composition according to embodiments of the present disclosure may include latex microparticles, latex emulsions and/or plasticizers. A dry mixture/powder may be formed of at least one absorbent material, including but not limited to, an absorbent powder, a superabsorbent powder, and fine aggregates. In embodiments of the present disclosure, when a latex-based formulation is applied to a surface, the latex-based formulation may fill gaps in the surface, and cracking and shrinkage of the surface may be reduced or prevented. After the formulation is applied to a surface, the formulation may be set to the surface by covering the formulation applied to the surface with a material and/or the formulation may be self-setting on the surface.

What follows are several different formulations according to embodiments of the present disclosure including methods of forming and possible uses of same. These formulations are not meant to be all-inclusive but merely examples.

Formulation A: Formulation Formed by Blending a Wet Mixture and a Dry Mixture

In a method according to an embodiment of the present disclosure, a formulation may be formed by blending a wet mixture and a dry mixture, and the formulation may then be applied to a surface. The wet mixture may provide a natural and/or a synthetic latex suspension that may be formed of a plurality of polymer microparticles in an aqueous medium. It should be appreciated that synthetic latex suspensions may be used as part of the wet mixture forming the formulation and may include, but are not limited to, styrene-butadiene rubber, acrylonitrile butadiene rubber, acrylic polymers, and polyvinyl acetate. The dry mixture may include at least one absorbent material. It should be appreciated that an absorbent material may be an organic material including, but not limited to, cellulose, natural husk fibers from coconut, pulverized tumbleweed, and sawdust. It should further be appreciated that an absorbent material may include, but is not limited to, volcanic ash, vermiculite, and InstaZorb® available from InstaZorb International, Inc. The at least one absorbent material may swell beyond its size and maintain its shape, and as such, may prevent shrinkage and/or cracks on the surface as the surface is then dried and cured.

According to some embodiments of the present disclosure, extremely thin and brushable layers of the formulation may be applied to a surface, regardless whether the surface is a vertical surface or a horizontal surface, or whether the formulation is applied in a vertical orientation or a horizontal orientation. However, in other embodiments, a single layer of the formulation may be applied.

In some embodiments of the present disclosure, the wet mixture and the dry mixture may be blended by folding the wet mixture into the dry mixture. The blending step may include hand kneading and/or mechanically mixing a predetermined amount of the wet mixture into a predetermined amount of the dry mixture, and the amounts may be proportional to one another. It should be appreciated that the predetermined amount of the wet mixture may be approximately 65% of the formulation, and the predetermined amount of the dry mixture may be approximately 35% of the formulation. It should further be appreciated that the percentages of the wet mixture and the dry mixture may be higher or lower without departing from the present disclosure. For example, the dry mixture may comprise from approximately 1% up to approximately 35-40% of the resultant formulation without departing from the present disclosure. It should also be appreciated that the proportion of the wet mixture to the dry mixture may be modified before and/or during the blending step and may be used to obtain a desired consistency of the formulation. It should be appreciated that a higher percentage of the dry mixture may provide a formulation that may include lumps of the dry mixture or a lumpy texture if desired. It should also be appreciated that if a wetter thickened paste texture is desired, a higher percentage of wet mixture may be utilized. There also may be embodiments where the wet mixture may be used without the dry mixture without departing from the present disclosure.

The method may provide coating the surface with water prior to and/or after blending the wet mixture and the dry mixture. It should be appreciated that coating the surface with water may reduce an amount of texture that may provided on the surface and/or may create a smooth finish on the surface when the formulation is applied. It should further be appreciated that coating the surface may be accomplished by spraying a mist of water on a surface. It should also be appreciated that the surface may be coated before significant setting or curing occurs by periodically moistening the surface with a mist of water.

It should further be appreciated that the formulation may include additional components including, but not limited to, plasticizers, minerals, and clay in some embodiments of the present disclosure. In some embodiments of the present disclosure, the wet mixture forming part of the formulation may be a material that may provide a density that is approximately 30% less than the density of cement. It should further be appreciated that the density of the wet mixture prior to addition of the dry mixture may be similar to a density of peanut butter or typical household caulks, such as in the range of approximately 1.09 g/cm³. It should be appreciated that use of such a wet mixture may provide a plurality of improved characteristics over conventional formulations and coatings, as described in further detail below. However, while some specification formulations are described herein, it should be appreciated that the wet mixture also could be an off-the-shelf product, such as a generic latex paint for applying to interior walls.

The formulation according to embodiments of the present disclosure may used as a coating and/or gap filler for various purposes, including but not limited to filling voids in walls, repairing moldings, repairing contoured surfaces, addressing chips in surfaces, as well as prop-patching and construction, art fabrication, top coats for sculptures, decorative molds, and constructing molds. Upon application of the formulation to a surface or material, cracks in the surface/material will not occur or at least will be minimized (i.e., cosmetic cracks that may be easily repaired). In an embodiment of the present disclosure, the formulation may be a bone powder sculpting (BPS) formulation having less water content than other formulations described herein.

If an area to be coated, whether filled or patched, is porous, a nominal application of the formulation may be used to fill gaps of approximately 2-4 inches in width or even greater than approximately 4 inches without cracking or with a shallow cosmetic crack that may be easily filled. It should be appreciated that the formulation may be thick and sculptable. It should also be appreciated that application of the formulation to a glass, fiberglass, metal, or another non-porous surface may provide one or more layers of a thin coating in embodiments of the present disclosure. It should be appreciated that a thin coating may be less than approximately two inches per layer and/or less than approximately four inches per layer in embodiments of the present disclosure.

It should be appreciated that properties of the dry mixture may provide applying the formulation using any orientation on the surface based on a composition of the dry mixture, such as, the dry mixture composition by volume percent provided in Table 1A.

TABLE 1A

Exemplary Composition of Dry Mixture for Formulation

| Component | Fraction/% |
| --- | --- |
| Absorbent Material | 11.1 |
| Kaolin clay | 33.3 |
| Sifted *sphagnum* moss | 22.2 |
| Ground corn cob (size M80) | 33.3 |

While certain volume percentages are provided for the dry mixture components in Table 1A, it should be appreciated that the volume percentages may be higher or lower for each component without departing from the present disclosure. Further, more or fewer or similar functioning components may be used without departing from the present disclosure.

As listed in Table 1A, an embodiment of the present disclosure may provide a dry mixture which may comprise components including one part absorbent material, two parts sifted sphagnum moss, three parts M-80 Grit-O'Cob® powder, and three parts Kaolin clay.

In an embodiment, sphagnum moss utilized in the dry mixture may provide fine particles that may be sifted through a 16 inch by 16 inch mesh and/or may provide ground particle sizes that do not exceed approximately 6 millimeters. It should be appreciated that other peat mosses may be used in addition to or in place of sphagnum moss in embodiments of the present disclosure. It should be appreciated that Grit-O'Cob powder may provide a particle size that may be of common industrial grade 1420 and may range from grades M80-M25. Further, while Grit-O'Cob powder is utilized in the dry mixture, it should be appreciated that other corncob granular products may be used in addition to or in place of Grit-O'Cob powder. It should be appreciated that Kaolin clay may be a pulverized clay. While Kaolin clay is utilized in a dry mixture according to embodiments of the present disclosure, other clays may be used in addition to or in place of Kaolin clay without departing from the present disclosure.

It should be appreciated that a suitable absorbent material may comprise an inorganic material that may intake an amount of liquid, such as an aqueous liquid, and the absorption may range from 150 percent to 800 percent times the weight of the absorbent material. It should be appreciated that an absorbent material included in the formulation may provide absorption of aqueous liquids without departing from the present disclosure. It should be appreciated that the absorbent material may predominantly include an amorphous aluminum silica that may be treated with a surfactant and may reduce surface tension, thereby accelerating a rate of absorption. It should be appreciated that the surfactant may be approximately two percent by weight of the resultant absorbent material in embodiments of the present disclosure.

It should be appreciated that the absorbent material may largely include naturally occurring volcanic minerals that may be of the type commonly used to absorb non-aqueous liquids. It should be appreciated that the phrase "largely include" may provide at least one part of a material in the dry mixture. It should be appreciated further that the naturally occurring volcanic material may be an expanded volcanic mineral that may be treated with a surfactant. In an embodiment of the present disclosure, the surfactant may be Insta-Zorb and may absorb up to 465 percent its weight in liquid. It should further be appreciated that the amount of liquid absorbed may vary depending on the properties and the density of the liquid. It should be appreciated that the absorbent material may include the following composition, by weight percentage, in an embodiment of the present disclosure.

| | |
| --- | --- |
| $SiO_2$ | 74% |
| $Al2O_3$ | 12.5% |
| $Na2O$ | 3.5% |
| $MgO$ | 1% |
| $CaO$ | 1% |
| $K_2O$ | 0.5% |
| $H_2O$ | 0.5% |
| Surfactant | 2% |
| Other | 5% |

It should be appreciated that the formulation may include approximately 0.25 parts of the dry mixture per each part of the wet mixture by volume. It should be appreciated that the formulation may provide a density of approximately 1.2 g/cm³. It should further be appreciated that the formulation may provide an acceptable range of the volumetric ratio of the dry mixture to the wet mixture of less than approximately 0.01 to at least approximately 0.30 parts of the dry mixture to one part of the wet mixture in embodiments of the present disclosure.

According to an embodiment of the present disclosure, Table 1B lists the composition including 0.25 parts of the dry mixture and one part of the wet mixture for Formulation A.

TABLE 1B

Exemplary Composition of 0.25 Parts
Dry Mixture and One Part Wet Mixture

| Component | Fraction in Mixture/% |
|---|---|
| Absorbent Material | 2.22 |
| Kaolin clay | 6.67 |
| Sifted *sphagnum* moss | 4.44 |
| Ground corn cob (size M-80) | 6.67 |
| Water | 5.7 |
| Pigment dispersant | 0.2 |
| Clay (Fuller's Earth) | 0.8 |
| Silica | 0.1 |
| Defoamer | 0.2 |
| Latex | 17.0 |
| Water from latex | 13.9 |
| $TiO_2/Al(OH)_3$ | 0.9 |
| Ground Limestone ($CaCO_3$) | 30.2 |
| Talc/Silica | 8.5 |
| Plasticizer | 1.3 |
| Amine soluble styrene-acrylic | 0.1 |
| Biocide | 0.0 |
| Miscellaneous Additives | 1.1 |

While certain volume percentages are provided for the wet composition and the dry powder components in Table 1B, it should be appreciated that the volume percentages may be higher or lower for each component without departing from the present disclosure. Further, there may be more or fewer components without departing from the present disclosure. Additionally, more or fewer or similar functioning components may be used without departing from the present disclosure.

It should be appreciated that the formulation may provide a proportion that may be 0.25 parts of the dry mixture per each part wet mixture by volume. It should be appreciated that the formulation may provide a density of approximately 1.2 g/cm³. It should be appreciated that the volumetric ratio of the dry powder to wet mixture may provide less than approximately 0.01 to at least approximately 0.30 parts dry powder to one part wet mixture.

Formulation B: Formulation Formed from a Wet Mixture and a Dry Mixture Set by Covering with a Material In some embodiments of the present disclosure, a formulation may be formed by blending a wet mixture and a dry mixture, and the formulation may then be applied to a surface. The formulation may be set on the surface by covering the formulation applied to the surface with a material for a period of time, as further described below. The wet mixture may provide at least one of a latex emulsion and a plasticizer. It should be appreciated that the wet mixture may be formed of a proprietary wet mixture or suspension and/or a generic wet mixture or suspension, such as described with respect to Formulation A. Generic wet mixtures and suspensions may include, but are not limited to, a generic latex paint for applying to interior walls and an elastomeric paint. It should be appreciated that the wet mixture may provide a base for the formulation without departing from the present disclosure. The dry mixture may provide at least one of an absorbent powder, a superabsorbent powder, and fine aggregates. It should be appreciated that the formulation may provide a modified organic aggregate or a cement modified organic aggregate that may include a substantial percentage of latex material that may be less than approximately 3% cement by volume. It should be appreciated that the formulation may include a dry mixture that may not contain cement in some embodiments of the present disclosure. It should further be appreciated that the formulation of such an embodiment may harden by wicking and may include a water reducer that may be a superplasticizer such as polycarboxylate ether (PCE) powder.

It should be appreciated that the proportion of the dry mixture to the wet mixture may vary depending on the predetermined results or characteristics of the formulation that are desired. Characteristics of the formulation may include, but are not limited to, castable and moldable. For example, a formulation with structural castable properties or characteristics may be formed using approximately 3-5% latex emulsion and elastomer solids, approximately 1-5% plasticizer, approximately 0-2% cement, and approximately 10-30% cellulosic fiber. It should be appreciated that the formulation may provide a thick and sculptable coating and gap filler for the surface to which the formulation is applied.

It should be appreciated that a nominal application of the formulation to a porous surface may provide a coating that may have a thickness of up to approximately two inches per layer and/or up to approximately four inches per layer. It should be appreciated that application of the formulation to a surface may provide a repaired surface, such as described with respect to Formulation A. It should be appreciated that the formulation may fill wide gaps in a porous surface including, but not limited to, gaps greater than approximately ½ inch in depth and up to approximately four inches in width. It should further be appreciated that the formulation may be useful for filling voids and creating products from preformed molds such as for aesthetic and cosmetic purposes. It should be appreciated that the formulation may be used as a coating and/or gap filler in a plurality of applications including, but not limited to, faux earthen vessels (e.g., flower pots and vase exteriors), mold-making, paint recycling, rock and stone, faux brick and tile, brick repair, and small statuaries. It should be appreciated that surfaces to which the formulation may be applied may sustain less damage when coming into contact with a hard surface compared to surfaces to which conventional formulations may be applied. It should be appreciated that the formulation may be Klaytech and may be provided by Flex-A-Rock LLC. It should be appreciated that Klaytech may provide improved characteristics over conventional formulations and coatings. For example, Klaytech may provide greater impact strength than conventional formulations and coatings including, but not limited to, ceramic and fired terra cotta clay.

According to an embodiment of the present disclosure, the method may provide mixing and stirring the dry mixture into the wet mixture. The dry mixture and the wet mixture may be blended by folding the dry mixture into the wet mixture. The method may provide hand kneading and/or mechanically mixing a predetermined amount of the dry mixture into a predetermined amount of the wet mixture, and the amounts may be proportional to one another. It should be appreciated that the proportion of the dry mixture and the wet mixture may be modified before and/or during the blending step to obtain a desired consistency of the formulation. In some embodiments of the present disclosure, the consistency may be dough-like in nature.

After the blending step, the method may provide applying the formulation to the surface. The method also may provide setting the formulation to the surface. It should be appreciated that the formulation may provide a moldable and castable surface when the formulation is applied. The portions of the surface to which a formulation that does not include a superplasticizer (such as PCE) is applied may be covered with a damp cotton-based material and/or covered with a cellophane material for a first time period and may subsequently be allowed to dry for a second time period. It should be appreciated that materials other than a cotton-based material and cellophane may cover the formulation and the surface to which the formulation is applied. It should be appreciated that the first time period may be approximately 24-48 hours without departing from the present disclosure. It should be appreciated that second time period may be approximately 2-10 days without departing from the present disclosure. However, the time periods may be longer or shorter in other embodiments of the present disclosure. For example, it may be desirable to slow down drying of the surface to which the formulation is applied to further minimize/prevent cracking of the surface.

It should be appreciated that covering the formulation and the surface to which the formulation is applied may impede drying during the first time period by trapping moisture in the formulation. It should be appreciated that citrus, confectioners sugar, a mist of water, and/or covering the surface to which a formulation is applied with a damp cloth or cellophane cover may slow or impede drying, so that cracks may not form on the surface to which the formulation is applied. It should be appreciated that embodiments of the present disclosure may provide a formulation that may be removed from a mold without adding citrus, confectioners sugar, a mist of water, and/or covering the surface to which a formulation is applied. It should further be appreciated that formulations not including a superplasticizer may be applied to a surface but not covered, as the superplasticizer may act as a water reducing component on its own.

Table 2A lists a dry mixture composition by volume percent in an embodiment of the present disclosure.

TABLE 2A

Exemplary Composition of Dry Mixture for Formulation

| Component | Fraction/% |
| --- | --- |
| Superplasticizer polycarbonate ether (PCE) powder | 4.54 |
| Acrylic dry polymer (Drycryl ™ DP-2903) | 4.54 |
| Kaolin clay | 22.73 |
| Sifted *sphagnum* moss | 22.73 |
| Ground corn cob (size M80) | 22.73 |
| Sand | 22.73 |

While certain volume percentages are provided for the dry mixture components in Table 2A, it should be appreciated that the volume percentages may be higher or lower for each component without departing from the present disclosure. Further, there may be embodiments where there are more or fewer components in the dry mixture without departing from the present disclosure. Additionally, more or fewer or similar functioning components may be used without departing from the present disclosure.

As listed in Table 2A, it should be appreciated that an embodiment of the present disclosure may provide a dry mixture which may comprise components including one part superplasticizer polycarbonate ether (PCE) powder, one part acrylic dry polymer (Drycryl™ DP-2903), five parts Kaolin clay, five parts sand, five parts sphagnum moss, and five parts M-80 Grit-O'Cob powder may have similar characteristics to those same components described with respect to Formulation A. It should be appreciated that fine sand may provide a 40 F grit size. It should be appreciated that the superplasticizer (PCE) be in powder form; however, there may be embodiments where the superplasticizer may be utilized in a liquid form. It should further be appreciated that Drycryl DP-2903 may increase flexibility and flexural strength in cement-based mixtures. It should also be appreciated that Drycryl DP-2903 may be added to Formulation B to compensate for a lack of latex that may be found in formulations that may include a water-based acrylic paint.

It should be appreciated that a formulation not containing a superplasticizer may be applied to a surface and covered with a material according to an embodiment of the present disclosure. It should further be appreciated that the material may be a damp cotton-based material or cellophane. It should be appreciated that the material may cover the surface of such an embodiment to which the formulation is applied for a first time period, and the first time period may be approximately 24-48 hours. It should be appreciated that the formulation of such an embodiment may be fast-drying. It should be appreciated that fast-drying may provide drying the surface to which the formulation is applied within approximately 2-10 days without departing from the present disclosure. However, the drying time may be longer or shorter without departing from the present disclosure.

It should also be appreciated that a total area of the surface to which the formulation is applied may be proportional to a drying time. It should further be appreciated that a large surface area may provide a faster drying time than a small surface area, even if one or more thick coatings of the formulation are applied to the surface. It should be appreciated that a formulation including cement may increase the drying time and may increase a period of time that may elapse before the surface hardens. It should further be appreciated that the formulation including cement may start a chemical reaction of components provided in the formulation when the formulation is applied to a surface. It should be appreciated that water may leach or wick out of the surface to which the formulation is applied, after air may enter the wet mixture and movement of the surface may be eliminated. It should further be appreciated that after water leaches or wicks out of the surface, cement glue bonds may occur by slaking, crystallizing, or cementitious glue bonding.

Table 2B lists the components of a formulation (Formulation B) according to an embodiment of the present disclosure including one part of the dry mixture and 0.75 parts of a generic latex paint.

TABLE 2B

Exemplary Composition of One Part Dry Mixture and 0.75 Parts Generic Latex Paint for Formulation

| Component | Fraction in Mixture/% |
| --- | --- |
| Pulverized Kaolin clay | 13.85% |
| Sifted *sphagnum* moss | 13.85% |
| Ground corn cob (size M80) | 13.85% |
| Silica sand | 13.85% |
| Superplasticizer (PCE) | 1.73% |
| Water | 10.33% |
| Clay | 0.06% |
| Silica | 0.06% |
| Defoamer | 0.04% |
| Latex | 4.37% |
| $TiO_2/Al(OH)_3$ | 4.43% |
| $CaCO_3$ | 16.24% |
| Talc/Silica | 1.48% |
| Plasticizer | 2.95% |
| Amine soluble Styrene-Acrylic | 2.67% |
| Biocide | 0.04% |
| Methyl cellulose | 0.15% |

While certain volume percentages are provided for the dry mixture components in Table 2B, it should be appreciated that the volume percentages may be higher or lower for each component without departing from the present disclosure. Further, there may be embodiments where there are more or fewer components in the dry mixture without departing from the present disclosure. Additionally, more or fewer or similar functioning components may be used without departing from the present disclosure.

As listed in Table 2B, it should be appreciated that an embodiment of the present disclosure may provide a dry mixture which may comprise components including five parts pulverized Kaolin clay, five parts fine silica, four parts sifted sphagnum moss, one part corn powder, one part confectioners sugar, two parts pulverized dust absorbent material, 0.25 part cement, 0.5 part citric acid, and 0.125 part polycarboxylate ether plasticizer (PCE). Again, the characteristics of sphagnum moss, Kaolin clay and corn cob powder have previously been described with respect to Formulation A, or earlier in the discussion of Formulation B. It should be appreciated that sand may be a fine silica sand and may provide a grit size including, but not limited to, pulverized flour, 30/45, 40 F, and 30/65. It should further be appreciated that sphagnum moss may provided in one to eight parts. It should be appreciated that corn cob powder may provide Grit-O'Cob powder including a particle size that may be of common industrial grade 1420 and may range from grades M80-M25, very fine powder, or very fine grit. It should be appreciated that corn cob powder may be provided in one to three parts. It should be appreciated that the pulverized dust absorbent material may be InstaZorb®. It should be appreciated that cement may provide a compressive strength that may reach approximately 2800 pounds per square inch (PSI). It should further be appreciated that cement may be provided in approximately 0.25 to 0.50 part.

It should be appreciated that while pulverized Kaolin clay is utilized in a dry mixture according to embodiments of the present disclosure, other clays may be used in addition to or in place of pulverized Kaolin clay without departing from the present disclosure. It should be appreciated that other peat mosses may be used in addition to or in place of sifted sphagnum moss in embodiments of the present disclosure. Further, while Grit-O'Cob powder may be utilized in the dry mixture, it should be appreciated that other corncob granular products may be used in addition to or in place of Grit-O'Cob powder in embodiments of the present disclosure. Similarly, while a pulverized dust absorbent material is utilized in a dry mixture according to embodiments of the present disclosure, other absorbent materials may be used in addition to or in place of a pulverized dust absorbent material without departing from the present disclosure. It should also be appreciated that while silica sand is utilized in the dry mixture according to embodiments of the present disclosure, other sands may be used in addition to or in place of silica sand without departing from the present disclosure.

It should be appreciated that the exemplary composition of the dry mixture for Formulation B, as provided in Table 2B, may provide standard drying times. It should be appreciated that standard drying times may be approximately 1-12 hours without departing from the present disclosure. It should further be appreciated that drying times may be higher or lower for each formulation without departing from the present disclosure. Further, the thickness of the formulation and/or the depth of the surface to which the formulation may be applied may affect drying times without departing from the present disclosure.

It should be appreciated that this formulation may provide a blended mixture of a generic latex paint into the dry mixture of approximately 0.75 parts generic latex paint per each part of the dry mixture by volume. It should be appreciated that the volumetric ratio of a generic latex paint to the dry mixture may provide approximately 0.60 to 0.80 parts generic latex paint per each part of the dry mixture without departing from the present disclosure. It should be appreciated that in such an embodiment the formulation may be Klaytech, and may provide approximately 0.60 to 0.69 parts wet mixture to one part dry mixture. It should further be appreciated that approximately 0.60 to 0.69 parts wet mixture may be latex paint and one part dry mixture may be powder in an embodiment of the present disclosure. It should be appreciated that the formulation may provide a density that may range between approximately 1.5 g/cm$^3$ and 2.0 g/cm$^3$.

Formulation C: Self-Setting Formulation Formed from a Wet Mixture and a Dry Mixture In some embodiments of the present disclosure, a formulation may be formed by blending a wet mixture and a dry mixture, and the formulation may then be applied to a surface. The formulation may be self-setting after a period of time and may not require being covered by a damp cotton-based material to assist in the setting process.

The wet mixture may provide at least one of a latex emulsion and a plasticizer. It should be appreciated that the wet mixture may be formed of a proprietary wet mixture or suspension and/or a generic wet mixture or suspension, such as described with respect to Formulation A. It should be appreciated that a proprietary wet mixture may provide a plurality of improved characteristics over conventional formulations and coatings including, but not limited to, mimicking stone, wood, stucco, and/or detailed textures that may include a hard finish or a finish that resembles stone. Generic wet mixtures and suspensions may include, but are not limited to, a generic latex paint for applying to interior walls and an elastomeric paint. It should be appreciated that the wet mixture may provide a base for the formulation without departing from the present disclosure.

The dry mixture may provide at least one of an absorbent powder, a superabsorbent powder, and fine aggregates. The formulation may provide a modified organic aggregate or a cement modified organic aggregate that may include a substantial percentage of latex material that may be less than approximately 3% cement by volume.

It should be appreciated that the proportion of the dry mixture to the wet mixture may vary depending on the predetermined results or characteristics of the formulation that are desired. For example, a formulation with structural castable properties or characteristics may be formed using approximately 3-5% latex emulsion and elastomer solids, approximately 1-5% plasticizer, approximately 0-2% cement, and approximately 10-30% cellulosic fiber. It should be appreciated that the formulation may provide a thick and sculptable coating and gap filler for the surface. It should be appreciated that a nominal application of the formulation to a porous surface may provide a coating that may have a thickness of up to approximately two inches per layer and/or up to approximately four inches per layer. It should be appreciated that application of the formulation to a surface may provide a repaired surface, such as described with respect to Formulation A. It should be appreciated that the formulation may fill wide gaps in a porous surface including, but not limited to, gaps greater than approximately ½ inch in depth and up to approximately four inches in width. It should further be appreciated that the formulation may be useful for filling voids and creating products from preformed molds for aesthetic and cosmetic purposes. It should be appreciated that the formulation may be used as a coating and/or gap filler in a plurality of applications including, but not limited to, faux earthen vessels (e.g., flower pots and vase exteriors), mold-making, paint recycling, rock and stone, faux brick and tile, brick repair, and small statuaries. It should be appreciated that in such an embodiment the formulation may be Klaytech, such as described with respect to Formulation B.

According to an embodiment of the present disclosure, the method may provide mixing and stirring the dry mixture into the wet mixture. The dry mixture and the wet mixture may be blended by folding the dry mixture into the wet mixture. The method may provide hand kneading and/or mechanically mixing a predetermined amount of the dry mixture into a predetermined amount of the wet mixture, and the amounts may be proportional to one another. It should be appreciated that the proportion of the dry mixture to the wet mixture may be modified before and/or during the blending step to obtain a desired consistency of the formulation. In an embodiment of the present disclosure, the formulation may be dough-like in consistency.

After the blending step, the method may provide applying the formulation to the surface. The method may provide self-setting the formulation on the surface for a period of time. It should be appreciated that a self-setting formulation may not require covering the surface prior to drying the surface. It should be appreciated that the period of time for self-setting may be approximately 1-12 hours without departing from the present disclosure. It should be appreciated that the inclusion of cement in the formulation of such an embodiment may provide faster drying times and hardening of the surface, such as described with respect to Formulation B.

According to an embodiment of the present disclosure, Table 2C lists the dry mixture composition by volume percent.

TABLE 2C

Exemplary Composition of Dry Mixture
for Self-Setting Formulation

| Component | Fraction/% |
| --- | --- |
| Kaolin clay | 26.5 |
| Sand | 26.5 |
| Sifted *sphagnum* moss | 21.2 |
| Corn cob powder | 5.3 |
| Confectioners sugar | 5.3 |
| Pulverized dust absorbent material | 10.6 |
| Portland cement | 1.3 |
| Citric acid | 2.65 |
| Polycarboxylate ether plasticizer (PCE) | 0.66 |

While certain volume percentages are provided for the dry mixture components in Table 2C, it should be appreciated that the volume percentages may be higher or lower for each component without departing from the present disclosure. Further, there may be fewer or more components without departing from the present disclosure. Additionally, more or fewer or similar functioning components may be used without departing from the present disclosure.

As listed in Table 2C, it should be appreciated that an embodiment of the present disclosure may provide the dry mixture which may comprise components including five parts pulverized Kaolin clay, five parts fine silica, four parts sifted sphagnum moss, one part corn powder, one part confectioners sugar, two parts pulverized dust absorbent material, 0.25 part cement, 0.5 part citric acid, and 0.125 part polycarboxylate ether plasticizer (PCE). Again, the characteristics of Kaolin clay, sphagnum moss, corn powder and fine silica have previously been described. It should be appreciated that the pulverized dust absorbent material may be InstaZorb®. It should be appreciated that cement may provide a compressive strength that may reach 2800 pounds per square inch (PSI). It should further be appreciated that cement may be provided in approximately 0.25 to 0.50 part. It should also be appreciated that while Portland cement is utilized in the dry mixture according to embodiments of the present disclosure, other cements may be used in addition to or in place of Portland cement.

It should be appreciated that the exemplary composition of the dry mixture for Formulation C, as provided in Table 2C, may provide standard drying times. It should be appreciated that standard drying times may include approximately 1 to 12 hours.

According to an embodiment of the present disclosure, Table 2D lists the composition of the formulation including one part of the dry mixture and 0.75 parts of a generic latex paint.

TABLE 2D

Exemplary Composition of One Part Dry Mixture and 0.75
Parts Generic Latex Paint for Self-Setting Formulation

| Component | Fraction in Mixture/% |
| --- | --- |
| Pulverized Kaolin clay | 15.14% |
| Sifted *sphagnum* moss | 12.11% |
| Ground corn cob (size M-80) | 3.03% |
| Confectioners sugar | 3.03% |
| Citrus acid | 1.51% |
| Silica sand | 15.14% |
| Superplasticizer (PCE) | 0.38% |
| Absorbent material (InstaZorb) | 6.05% |
| Hydraulic or Portland Cement | 0.76% |
| Water | 10.33% |
| Clay | 0.06% |
| Silica | 0.06% |
| Defoamer | 0.04% |
| Latex | 4.37% |
| $TiO_2/Al(OH)_3$ | 4.43% |
| $CaCO_3$ | 16.24% |
| Talc/Silica | 1.48% |
| Plasticizer | 2.95% |
| Amine soluble Styrene-Acrylic | 2.67% |
| Biocide | 0.04% |
| Methyl cellulose | 0.15% |

While certain volume percentages are provided for the dry mixture components in Table 2D, it should be appreciated that the volume percentages may be higher or lower for each component without departing from the present disclosure. Further, there may be more or fewer components without departing from the present disclosure. Additionally, more or fewer or similar functioning components may be used without departing from the present disclosure.

It should be appreciated that the formulation may provide a proportion that may be 0.75 part of the dry mixture per each part wet mixture or general latex paint by volume. It should be appreciated that the formulation may provide a density of approximately 1.6 $g/cm^3$. It should be appreciated that the volumetric ratio of the dry mixture to wet mixture may provide less than approximately 1.25 to at least approximately 1.65 parts dry mixture to one part wet mixture.

Formulation D: Formulation Formed from a Wet Composition and a Dry Powder

In a method according to some embodiments of the present disclosure, a formulation may be formed by blending a wet composition and a dry powder, and the formulation may then be applied to a surface. The wet composition may provide at least one of a latex emulsion and a plasticizer. It should be appreciated that the wet mixture may be formed of a proprietary wet mixture or suspension and/or a generic wet mixture or suspension, such as described with respect to Formulation A. It should be appreciated that a proprietary wet mixture may provide a plurality of improved characteristics over conventional formulations and coatings, as described in further detail below. Generic wet compositions and suspensions may include, but are not limited to, common ingredients that may be publicly disclosed and obtained off-the shelf, such as, a generic latex paint for applying to interior walls and an elastomeric paint. It should be appreciated that the wet composition may provide a base for the formulation without departing from the present disclosure. The dry mixture powder may provide at least one of an absorbent powder, a superabsorbent powder, and fine aggregates. The formulation may provide a modified organic aggregate or a cement modified organic aggregate that may include a substantial percentage of latex material that may be less than 3% percent cement by volume.

It should be appreciated that the proportion of the dry powder to the wet composition may be varied depending on the predetermined results or desired characteristics of the formulation that are desired. For example, a formulation with structural castable properties may be formed using a net composition of approximately 30% latex emulsion and elastomer solids, approximately 14% plasticizer, approximately 3% cement, and approximately 18% cellulosic fiber. It should be appreciated that the formulation may fill wide gaps in a porous surface including, but not limited to, gaps greater than approximately ½ inch in depth and up to approximately four inches in width. It should further be appreciated that the formulation may be used as a coating and/or gap filler in a plurality of applications including, but not limited to, coat textures, constructing molds, cement patch repair, statuaries, tiles and bricks, art projects, gap fillers, faux rock and stone, and large vessels. It should be appreciated that the formulation may be Flex-C-Ment and may be provided by Flex-A-Rock LLC.

In an embodiment of the present disclosure, the method may provide blending the wet composition and the dry powder. The wet composition and the dry powder may be blended by folding the wet composition into the dry powder. The wet composition and the dry powder may be blended by hand kneading and/or mechanically mixing a predetermined amount of the wet composition and the dry powder. It should be appreciated that the wet composition and the dry powder may be blended until the formulation has a doughy consistency in an embodiment of the present disclosure. It should be appreciated that a proportion of the wet composition and the dry powder may be modified before and/or during the blending step to obtain a desired consistency of the formulation.

After blending, the formulation may be applied to a surface. The method may provide curing the surface after the formulation is applied. It should be appreciated that the formulation may reduce cracking and shrinkage of the surface. It should be appreciated that absorbent materials may swell beyond their size and maintain their shape, and as such, may prevent shrinkage and/or cracks during the drying and curing process. It should be appreciated that the method may provide coating the surface with water prior to and/or after blending the wet composition and the dry powder. It should be appreciated that coating the surface with water may reduce an amount of texture that may provided on the surface and/or may create a smooth finish on the surface, so that imperfections may be reduced or even eliminated from the surface. It should further be appreciated that coating the surface may be accomplished by spraying a mist of water on a surface. It should also be appreciated that the surface may be coated before significant setting or curing occurs by periodically moistening the surface with a mist of water.

According to an embodiment of the present disclosure, Table 3A lists the composition of the dry powder for Formulation D.

TABLE 3A

Exemplary Composition of the Dry Powder for Formulation

| Component | Formulation Fraction/% |
|---|---|
| Portland Cement | 5.38% |
| Kaolin clay | 10.75% |
| Sifted *sphagnum* moss | 21.51% |
| Ground corn cob (size M80) | 2.69% |
| Confectioners sugar | 5.38% |
| Citrus acid | 0.54% |
| Sand | 53.76% |

While certain volume percentages are provided for the dry mixture components in Table 3A, it should be appreciated that the volume percentages may be higher or lower for each component without departing from the present disclosure. Again, more or fewer components may be utilized without departing from the present disclosure. Further, more or fewer or similar functioning components may be used without departing from the present disclosure.

As listed in Table 3A, it should be appreciated that an embodiment of the present disclosure may provide the dry powder which may comprise components including two parts cement, four parts Kaolin clay, eight parts sifted sphagnum moss, one part corn powder, two parts confectioners sugar, 0.2 part citric acid that may be in powder form, and 20 parts silica sand. Characteristics of certain components, such as Kaolin clay and sphagnum moss, have been described with respect to other formulations. It should be appreciated that cement may provide a compressive strength that may reach 2800 pounds per square inch (PSI). It should further be appreciated that cement may be provided in 1 to 2 parts. It should be appreciated that confectioners sugar may be optional. It should further be appreciated that confectioners sugar may be provided in 0 to 2 parts. It should be appreciated that citric acid may be food grade and may be provided in powder form. It should further be appreciated that citric acid may be provided in 0 to 0.25 part. It should be appreciated that a polycarboxylate ether plasticizer may be provided in 0 to 0.125 parts. It should be appreciated that sand may be a fine silica sand and may provide a grit size including, but not limited to, pulverized flour, 30/45, 40 F, and 30/65. It should further be appreciated that sand may be provided in 1 to 20 parts. It should further be appreciated that a polycarboxylate ether plasticizer may accelerate the drying time of the formulation, as provided in Table 3A.

According to an embodiment of the present disclosure, Table 3B lists the composition including 0.33 parts of the wet composition and one part of the dry powder for Formulation D.

TABLE 3B

Exemplary Composition of 0.33 Parts Wet Composition and One Part Dry Powder

| Component | Fraction in Mixture/% |
|---|---|
| Pulverized kaolin clay | 2.67% |
| Sifted *sphagnum* moss | 5.34% |

TABLE 3B-continued

Exemplary Composition of 0.33 Parts Wet
Composition and One Part Dry Powder

| Component | Fraction in Mixture/% |
|---|---|
| Ground corn cob (size M-80) | 0.67% |
| Confectioners' sugar | 1.33% |
| Citric acid | 0.13% |
| Silica sand | 13.34% |
| Hydraulic or Portland cement | 1.33% |
| Water | 5.34% |
| Pigment Dispersant | 0.20% |
| Clay (Fuller's Earth) | 0.75% |
| Silica | 0.09% |
| Defoamer | 0.14% |
| Latex | 16.00% |
| Water from latex | 13.03% |
| TiO2/Al(OH)3 | 0.89% |
| Ground limestone (CaCO3) | 28.38% |
| Talc/Silica | 7.98% |
| Plasticizer | 1.25% |
| Amine soluble styrene-acrylic | 0.09% |
| Biocide | 0.00% |
| Miscellaneous Additives | 1.06% |

While certain volume percentages are provided for the wet composition and the dry powder components in Table 3B, it should be appreciated that the volume percentages may be higher or lower for each component without departing from the present disclosure. Further, there may be more or fewer components without departing from the present disclosure. Additionally, more or fewer or similar functioning components may be used without departing from the present disclosure.

It should be appreciated that the formulation may provide a proportion that may be 0.33 parts of the wet mixture per each part dry powder by volume. It should be appreciated that the formulation may provide a density of approximately 1.9 g/cm$^3$. It should be appreciated that the volumetric ratio of the dry powder to wet mixture may provide less than approximately 0.1 to at least approximately 0.5 parts dry powder to one part wet mixture.

In some embodiments of the present disclosure, the formulation may be formed by blending a wet suspension that may include latex polymer microparticles with dry components. It should be appreciated that the dry components may include organic fibers, as well as inorganic materials that may include volcanic ash. It should be appreciated that volcanic ash may have a high volumetric liquid absorption ratio. It should further be appreciated that absorbent materials may include, but are not limited to, cellulose, Kaolin clay, vermiculite, corn cob, talc, volcanic ash, peat, and sawdust. It should be appreciated that the formulation may provide relatively low quantities of cement, e.g., less than 3 percent by volume, and may be referred to as "cement modified organic aggregate enriched latex." It should further be appreciated that surfaces to which the formulation is applied may be cured and provide cured compositions that may exhibit high strength structural and adhesive properties when compared to conventional latex-based formulations. It should also be appreciated that high strength structural and adhesive properties may be easily observed such as through visual and/or tactile inspection. It should be appreciated that the drying process of the formulation on surface may be assisted by the porous nature of the dry mixture, the at least one dry mixture, and the dry powder. It should further be appreciated that these dry components may provide weep hole venting and evaporation that may occur throughout the exposed surfaces.

It should be appreciated that the dry mixture, the at least one dry mixture, and/or the dry powder may include proportions of components that may be modified by 20% or more without departing from the present disclosure. It should be appreciated that components of the dry mixture, the at least one dry mixture, and/or the dry powder may be mixed with suspensions including, but not limited to, commercially available interior and exterior latex paints and elastomeric paints.

According to an embodiment of the present disclosure, Table 4 lists a composition for a wet mixture that may form formulations including, but not limited to, Formulation A, Formulation B, Formulation C, and Formulation D.

TABLE 4

Exemplary Composition of a Wet Mixture
for Formulations A, B, C, and/or D

| Component | Weight % |
|---|---|
| Calcium carbonate | 30-40% |
| Acrylic polymer | 20-30% |
| Talc | 10-20% |
| Benzyl butyl phthalate | 1.0-1.5% |
| Titanium dioxide | 1.0-1.5% |
| Crystalline silica | 0.1-1.0% |
| Ammonium hydroxide | 0.2% |

It should be appreciated that Flex-A-Rock may be a wet mixture that may form formulations including, but not limited to, BPS formulations, Klaytech, and Flex-C-Ment. It should further be appreciated that Flex-A-Rock may be non-toxic and environmentally-friendly, and may turn latex paint waste into useful products for applications including, but not limited to, coat textures, constructing molds, cement patch repair, statuaries, tiles and bricks, art projects, gap fillers, faux rock and stone, and large vessels.

It should be appreciated that formulations including Flex-A-Rock (e.g., BPS formulations, Klaytech, and Flex-C-Ment) may provide a plurality of improved characteristics over conventional formulations including, but not limited to, a density less than the density of cement, a strength similar to the strength of cement, and the ability to retain flexibility in subzero temperatures. It should be appreciated that latex and/or plasticizers that may be provided in formulations including Flex-A-Rock may help to bond the components together, both to themselves as well as to the surface. It should be appreciated that subzero temperatures may include temperatures down to −20° Fahrenheit. It should further be appreciated that formulations including Flex-A-Rock having a thickness of approximately ⅛ inches and may not become brittle, even in subzero temperatures. It should also be appreciated that moisture in a porous surface to which the formulation has been applied may heave or otherwise shift up the top layer of the surface or cause upwards swelling of the surface, should ice form underneath the surface. It should be appreciated that formulations including Flex-A-Rock may be applied to a surface to mimic stone, wood, stucco, and/or detailed textures that may include a hard finish or a finish that resembles stone. It should be appreciated that formulations including Flex-A-Rock may be applied to a surface, thereby preventing cracking or chipping of the surface to which the formulation is applied. It should be appreciated that formulations including Flex-A-Rock should not include harmful volatile organic compounds. It should be appreciated that formulations including Flex-A-Rock may easily become tinted and may accept waterborne and oil stains. It should be appreciated that formulations including Flex-A-Rock may dry quickly. It should further be appreciated that formulations including Flex-A-Rock may provide a Class A fire rating that may provide a likelihood of protection against the spread of flames during a fire. It should also be appreciated that formulations including Flex-A-Rock may self-prime on a surface including, but not limited to, metal and fiberglass. It should further be appreciated that formulations including Flex-A-Rock may be applied to a surface using a plurality of application methods, but not limited to, stenciling, troweling, brushing, and hoppering.

It should be appreciated that with respect to surfaces used for walking and driving, embodiments of the present disclosure may provide formulations that may have a high tensile strength and durability, resistance to abrasion and flexibility to accommodate stress including, but not limited to, accommodating surface deflections that may be caused by the weight of rolling vehicles, without causing the surfaces to crack. It should be appreciated that it may be desirable to replace conventional cement systems with formulations that may provide a high tensile strength and durability, resistance to abrasion and flexibility to accommodate stress. It should further be appreciated that conventional cement systems may be repaired by formulations that may provide a high tensile strength and durability, resistance to abrasion and flexibility to accommodate stress.

It should be appreciated that embodiments of the present disclosure may provide formulations that may be applied to horizontal surfaces and/or inclined surfaces using a single layer of approximately two to three inches in thickness. It should be appreciated that these formulations may provide curing of surfaces so that no cracking of the surface and minimal shrinkage will occur. It should be appreciated that formulations containing fine aggregates and/or dried absorbent material may provide less shrinkage of the surface when compared to conventional formulations and coatings. It should be appreciated that shrinkage of the surface may be easily observed by a naked eye and may not require measuring the surface to determine whether shrinkage occurs. It should be appreciated that formulations may provide cured surfaces that may exhibit relatively high levels of flexure and elasticity. It should be appreciated that relatively high levels of flexure and elasticity may provide greater flexibility of the surface when compared to conventional formulations and coatings. It should be appreciated that formulations may provide resilience and tolerance when subjected to high levels of mechanical stress and impact, and may not cause surfaces to crack. It should be appreciated that formulations may provide a greater tolerance than conventional formulations and coatings that may prevent the surface from cracking. It should further be appreciated that surfaces to which formulations are applied may not fracture or sustain as much damage compared to conventional formulations when contacting with a hard surface, even after repeated contact with a hard surface and/or after falling from high speeds. It should be appreciated that the formulation may have a lighter weight compared to conventional formulations, such as cement or concrete.

It should be appreciated that embodiments of the present disclosure may provide formulations that may provide a relatively low density, high levels of adhesion to surfaces that do not include adhesive properties, and may be applied to surfaces in relatively thick layers in vertical orientations, particularly as compared to conventional formulations and coatings.

It should be appreciated that an absorbent material utilized in formulations according to embodiments of the present disclosure may include a plurality of discrete absorbent or superabsorbent powders and fine aggregates without departing from the present disclosure. It should further be appreciated that the absorbent material may create a wicking process that may extend about and within an additive mixture. It should be appreciated that an additive mixture may include a wet product that may be mixed and/or folded together with one or more absorbent material according to embodiments of the present disclosure.

It should be appreciated that moisture in the formulations described herein may be drawn into hydrophilic action and may create internal drying through capillary wicking. It should further be appreciated that moisture and chemicals that may be provided in the dry mixture/powder may be drawn into particles that may harden in a moisture swollen state and may minimize shrinkage. It should be appreciated that as liquid is drawn into the dry mixture/powder, air may also enter the dry mixture/powder. It should be appreciated that the air the enters the dry mixture/powder may dry a formulation. It should further be appreciated that as a formulation thickens, air may reach the centermost areas of the formulation. It should be appreciated that superabsorbents may not be completely saturated by surrounding liquid and may continue to allow air to breathe within each formulation, and as such, the drying time of the centermost areas of each formulation may be increased. It should be appreciated that reducing the drying time and/or allowing the interior of the wet mixture to dry may reduce cracking of a surface to which a formulation is applied.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method of forming and applying a latex-based formulation to a surface, wherein the latex-based formulation comprises a wet mixture and a dry mixture, the method comprising:

hand-kneading the wet mixture and the dry mixture to form the latex-based formulation having a lighter weight compared to cement or concrete and a density less than a density of cement, wherein the wet mixture includes a natural and/or a synthetic latex suspension that is formed of a plurality of polymer microparticles in an aqueous medium and the dry mixture includes at least one absorbent material, Kaolin clay, sphagnum moss, ground corn cob, and no cement;

applying at least one layer of the latex-based formulation to the surface to sculpt the surface or construct a mold on or about the surface; and curing the surface after it has been sculpted or the mold has been constructed using the latex-based formulation, thereby reducing cracking and shrinkage of the surface.

2. The method of claim 1, wherein the surface is coated with water after the hand-kneading step.

3. The method of claim 1, wherein the at least one absorbent material includes one or more materials selected from the group comprising:

silica, alumina, sodium oxide, magnesium oxide, calcium oxide, potassium oxide, cellulose, natural husk fibers from coconut, pulverized tumbleweed, sawdust, volcanic ash, talc, peat, and vermiculite.

4. The method of claim 1, wherein the at least one absorbent material is an expanded volcanic mineral treated with a surfactant.

5. The method of claim 1, wherein, when applied to the surface, the latex-based formulation fills gaps in the surface.

* * * * *